(12) United States Patent
Craig et al.

(10) Patent No.: US 8,930,287 B2
(45) Date of Patent: Jan. 6, 2015

(54) DYNAMIC TRAINING FOR TAGGING COMPUTER CODE

(75) Inventors: Erik B. Craig, Raleigh, NC (US); Joseph Leong, West Lafayette, IN (US); Adrian X. Rodriguez, Durham, NC (US); Ian Tewksbury, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 13/290,105

(22) Filed: Nov. 6, 2011

(65) Prior Publication Data

US 2013/0117206 A1 May 9, 2013

(51) Int. Cl.
| | | |
|---|---|---|
| *G06F 15/18* | (2006.01) | |
| *G06F 9/44* | (2006.01) | |
| *G06F 17/20* | (2006.01) | |
| *G06F 21/00* | (2013.01) | |
| *G06N 99/00* | (2010.01) | |
| *G06E 1/02* | (2006.01) | |

(52) U.S. Cl.
CPC *G06F 8/75* (2013.01); *G06F 17/20* (2013.01); *G06F 21/00* (2013.01); *G06N 99/005* (2013.01); *G06F 9/44* (2013.01); *G06F 15/18* (2013.01); *G06E 1/02* (2013.01)
USPC .......................................................... 706/12

(58) Field of Classification Search
CPC ........................................................ G06F 8/75
See application file for complete search history.

(56) References Cited

U.S. PATENT DOCUMENTS

| | | | |
|---|---|---|---|
| 7,469,338 B2 * | 12/2008 | Buer ............................ | 713/170 |
| 7,552,093 B2 | 6/2009 | Levin et al. | |
| 7,631,294 B2 | 12/2009 | Rush et al. | |
| 7,698,335 B1 * | 4/2010 | Vronay ........................ | 707/737 |
| 2005/0154904 A1 | 7/2005 | Perepa et al. | |
| 2006/0156286 A1 | 7/2006 | Morgan et al. | |
| 2007/0233538 A1 * | 10/2007 | Zpevak et al. .................... | 705/8 |
| 2007/0240223 A1 * | 10/2007 | Zpevak et al. .................. | 726/25 |
| 2007/0260550 A1 * | 11/2007 | Pieper et al. .................... | 705/59 |
| 2008/0052662 A1 * | 2/2008 | Zeidman ........................ | 717/100 |
| 2008/0086433 A1 * | 4/2008 | Schmidtler et al. ............. | 706/12 |
| 2008/0091677 A1 * | 4/2008 | Pedersen et al. .................. | 707/6 |
| 2009/0164416 A1 * | 6/2009 | Guha .............................. | 707/2 |
| 2009/0210860 A1 | 8/2009 | Sutherland et al. | |
| 2010/0274813 A1 | 10/2010 | Lu et al. | |
| 2010/0306651 A1 | 12/2010 | Quennesson et al. | |

FOREIGN PATENT DOCUMENTS

| | | |
|---|---|---|
| JP | 2005115849 | 4/2005 |
| WO | 02054293 | 7/2002 |

OTHER PUBLICATIONS

Bowring, James F. et al.; "Active Learning for Automatic Classification of Software Behavior"; 2004; ACM; ISSTA'04; pp. 195-205.*

(Continued)

*Primary Examiner* — Stanley K Hill
(74) *Attorney, Agent, or Firm* — Grasso PLLC; Fred Grasso

(57) ABSTRACT

System, method, device and article of manufacture are provided wherein software code is sorted between optional pools using attributes of software in the target pools. Training for subsequent sorts can take place when attributes of already sorted code are considered and used when sorting previously unclassified code. Manual intervention may also be used to sort code and to verify the accuracy of previous sorts.

22 Claims, 5 Drawing Sheets

(56) References Cited

OTHER PUBLICATIONS

Patcha, Animesh et al.; "An overview of anomaly detection techniques: Existing solutilons and lates technological trends"; 2007; Elsevier; Computer Networks 51 (2007); pp. 3448-3470.*

Shabtai, Asaf et al.; "Detection of malicious code by applying machine learning classifiers on static features: A state-of-the-art survey"; 2009; ELSEVIER; Information Security Technical Report 14 (2009); pp. 16-29.*

Yuxin, Ding et al.; "Feature representation and selection in malicious code detection methods based on static system calls"; ELSEVIER; Computers & Security 30 (2011); pp. 514-524.*

Encryption Export Compliance Management—Black Duck Export, http://www.blackducksoftware.com/export, Black Duck Software, Inc., Waltham, MA, 2010.

* cited by examiner

DYNAMIC TRAINING FOR TAGGING COMPUTER CODE

BACKGROUND

The present invention relates to identifying whether certain textual computer code or other software is regulated by a governing agency, and more specifically, to systems, methods, devices, and articles of manufacture that classify the export status of source code or other computer software code using a dynamic or iterative training process for identifying and tagging the code.

The United States Department of Commerce includes a Bureau of Industry and Security (BIS). This Bureau, like other similarly situated regulating agencies around the world, is responsible for implementing and enforcing export regulations. These regulations include the export and re-export of many commercial items, including software. In certain instances approval in the form of a license may be required for commercial export of software or other regulated products from the United States. When software is the commercial item being exported the textual language of the software can be determinative as to whether or not an export license may be needed to export the software. Thus, much effort has been devoted to culling through and sorting software code to determine whether or not the code is subject to regulation and export licensing. Encryption software is an example of code commonly subjected to export licensing requirements.

BRIEF SUMMARY

Embodiments of the invention are directed to, methods, systems, devices, and articles of manufacture configured to or serving to identify, tag, or otherwise cull software text into different categories. Embodiments may include training methodologies that act to improve sorting and identification by learning from previous sorts and classifications.

Embodiments may include automated sorts and tagging carried out by computing devices, followed by hands-on manual verification, followed by subsequent automated sorts and tagging. In embodiments, numerous automated sorts may be carried out to finish the majority of the tagging and sorting of targeted software code. These automated sorts may be verified by occasional manual intervention and checking. Other sorting, tagging, and verification methodologies may also be used.

A Classification Coder (CC) or an Export Classification Coder (ECC) may each be used in embodiments. The CC and ECC may be in the form of code stored and subsequently run in various processes, systems, devices, and articles of manufacture. The CC and ECC may be run as an instance in a single computing device, across several computing devices, and over a network. The CC and ECC may also be in the form of a system and of a device. Still other embodiments are also possible as well.

DETAILED DESCRIPTION

Figure 1:
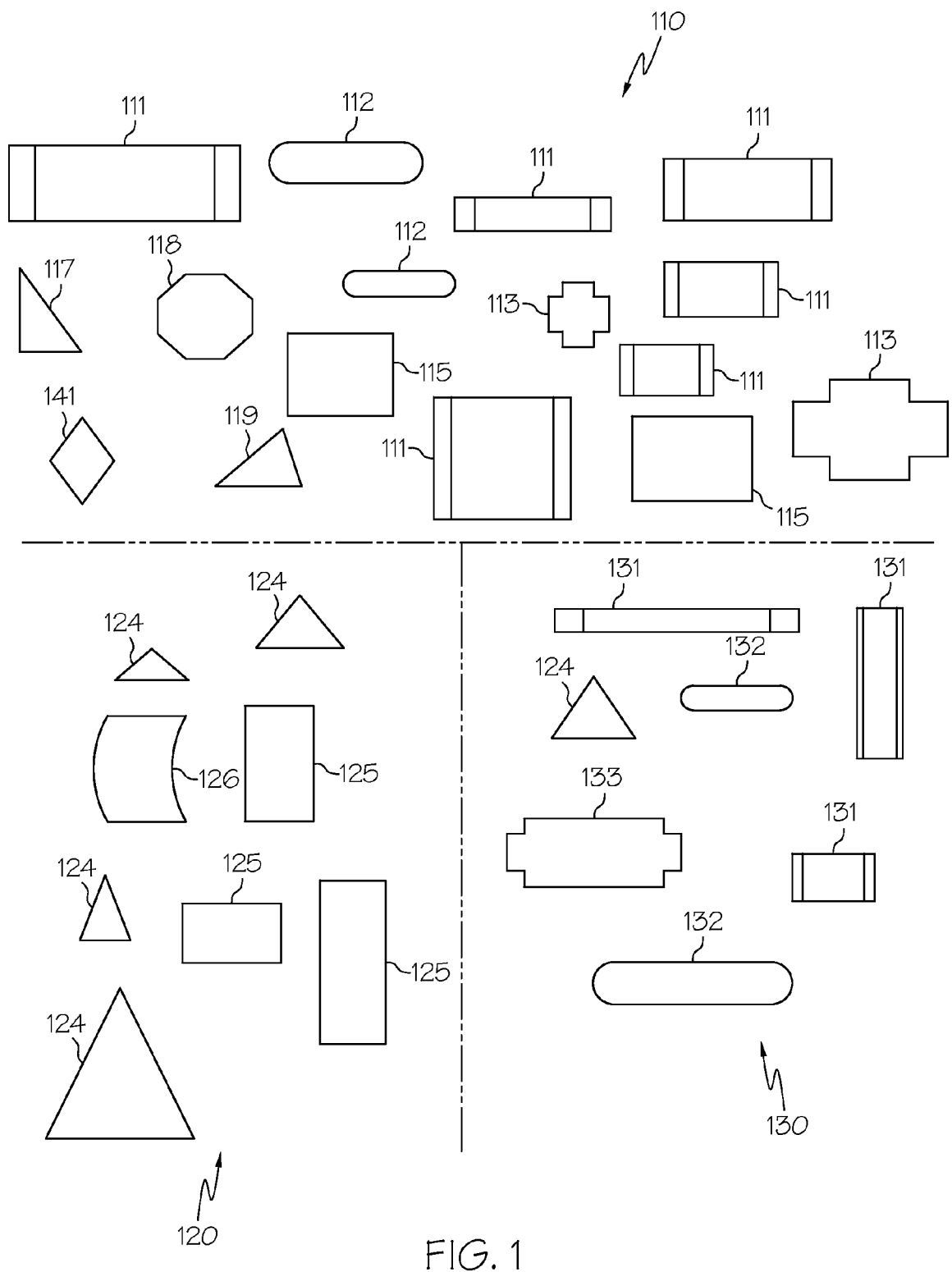
FIG. 1 shows logical representations of unclassified computer code and pools of classified computer code as may exist and be sorted in embodiments.

Embodiments may be directed to sorting and tagging software, including source code, and subsequent sorts and tagging events that may learn from or be improved by previous sorts or tags. Embodiments may include methods, systems, and devices that serve to sort through vast amounts of compiled and uncompiled computer code in order to flag or otherwise identify computer code whose export may be controlled by various national import or export procedures. These national export procedures or controls may include those set by the U.S. Department of Commerce Bureau of Industry and Security and the export administration regulations it implements and enforces. These export regulations may even apply to exports being made from a U.S. company to its branch office or to a wholly owned subsidiary located outside the U.S. Other agencies may also set forth their own regulations, the compliance with, may also be carried out by embodiments of the invention.

Embodiments, which may include an Export Classification Coder (ECC), may serve to vet vast amounts of textual code, flag code suspected of violating an applicable standard, or otherwise tag software code for further inspection. This further inspection may determine whether or not an earlier flagged set of code complies with the search criteria. This search criteria may include whether the code complies with government regulations or other regulating body affecting export of the code. The search criteria may be for other reasons as well. When code is suspected of being subject to regulation, such as export regulation, embodiments may include having the flagged code be subsequently licensed or otherwise approved for handling in accord with the applicable government regulation.

Embodiments may include sorting and flagging both compiled and uncompiled source code. The flags may indicate certain status for the code, for example, who can view the code, whether the code can be exported, whether the code is limited to a certain target architecture and for other reasons as well. With regard to security, for example, if different users have different security levels of authority, embodiments may be employed such that code may be sifted and sorted and tagged in order to identify code to be blocked from view from unauthorized users or users having insufficient levels of authority.

In embodiments, the attributes searched for by the Classification Coder (CC) and the Export Classification Coder (ECC) may be dynamically generated and dynamically modified or improved. This dynamic generation and dynamic modification may be considered to be a training sequence or training step used at the outset of a search and classification sequence, as well as in ongoing search and classification sequences. Improvement in subsequent searches and tagging may be derived from learning from growing pools of previously sorted text. Improvement may also be based on manual verification of tagged code. This manual verification may be conducted at regular intervals as well as at random intervals. Training and improvements may occur when comparisons are made between identically classified code and the differences and similarities between the code can be considered, evaluated, and used in subsequent classification operations.

In embodiments used to sort code, for export control for example, there may be three available pools of source code: an exportable pool; a nonexportable pool, and an unclassified pool. In embodiments, an ECC may be used to classify, tag or otherwise identify unclassified source code as belonging in the exportable pool or the nonexportable pool. For example, unclassified Java code may be reviewed to see whether it contains similar functions or imports as those already in an existing pool of exportable code or an existing pool of nonexportable code. If the functions or imports or both of the unclassified Java code are similar to code in a certain classified pool, then the unclassified Java code may be tagged as belonging to that particular classified pool of code having similar functions, imports, or other attributes.

In embodiments, the computer code being sorted and classified may be both compiled and uncompiled code. It is preferable for code to be similarly classified with other code having the same status. In other words it is preferable that compiled code be classified and tagged when considering other compiled code. Likewise, it is preferable for uncompiled code to be considered and tagged when compared against other uncompiled code. Still further, when code is being considered, patterns of usage within the same target architecture or similar target architecture are also preferred. Likewise, patterns within the same or similar compiler levels are also preferable for evaluation and training purposes.

In embodiments, the process may be initiated when source code is placed in a certain code repository, such as a CMVC/rational/subversion. After deposit, export regulated code that was previously tagged and identified may be selected by an ECC. This code may be used by the ECC as control data and training data for subsequent classifications. Concurrent with this, in embodiments, unclassified code in a repository may be identified by an ECC and selected for tagging. This unclassified code may be tested, sorted, or otherwise analyzed to identify code that is potentially regulated for export. Furthermore, as this unclassified code is analyzed, its attributes may be compared with previously tagged code and may be compared for exact matches and near matches. When the unclassified code is found to be similar enough it may be tagged for further review or it may be tagged as being export compliant.

Once tagged, a secondary review may be conducted of the tagged code to further improve or enhance the accuracy of code already flagged for export. Consequently, as more source code is classified, subsequently reviewed, and then used for training purposes for new and additional sorts, embodiments may become better trained and more suited to accurately identify, detect, and flag regulated computer code or other software.

Attributes of the computer code that may be considered for sorting and tagging include: both intrinsic and custom attributes; and may also include: common classes; common assemblies; common members; common constructors; common modules; common authors; common string names; common events; common thread calls; common attribute targets; and common structure. There may be other attributes that serve as a sorting and tagging mechanism as well.

FIG. 1 is a logical representation of unclassified source code 110, a pool of nonexportable source code 120, and a pool of exportable source code 130. In embodiments, and as shown in FIG. 1, source code with matching attributes may receive matching classifications. In FIG. 1 code with matching import attributes are shown at 131 and 111. The code labeled 111 has yet to be sorted and will be placed in the pool of exportable source code 130 when the sort is completed. Code with other matching attributes is also shown in FIG. 1. These other matching attributes may include matching functions, matching outputs, matching objects or classes, and other similarities as well. As the code is reviewed and sorted from the unclassified pool 110 it can be tagged or labeled such that it can be considered to be part of a sorted pool, either 120 or 130. As the sorting continues, embodiments may consider the attributes of already sorted code and may look for similar or matching attributes in the unsorted code. On occasion, code may be misclassified, as shown at 124. When misclassified, embodiments may identify the misclassified code 124 and may reclassify it properly for subsequent pools and searches.

In embodiments, source code with matching functions may also receive similar designations. In FIG. 1, for example, classified source code with matching functions is shown at 132. Still further, classified source code, with both matching imports and functions, may also be tagged and is shown at 133.

As with the pool of exportable source code 130, embodiments may also include a pool of nonexportable source code 120. The source code in this nonexportable source code pool 120 may include source code with similar or identical import attributes, similar or identical functionality, and other similarities as well. In each instance, however, the code does not meet the export regulations of the governing body, so the code is considered to be nonexportable.

Shown in FIG. 1 are several blocks of classified source code 124, with similar functions. The functionality of this classified source code demands that the source code should be considered nonexportable. Also shown in the pool of nonexportable source code 120 is source code having nonexportable structure 126 and source code having import attributes that make it nonexportable 125. Thus, various aspects of the code may be regulated and may require that the code be regulated by the applicable government regulation.

FIG. 1 also shows unclassified source code 110. Unclassified source code with exportable imports and functions is shown at 113, while unclassified source code with exportable import attributes is shown at 111, and unclassified source code with exportable functions is shown at 112. Pool 110 also contains source code that may not be readily classified by a CC or ECC. This code, here 118, and 119 may be flagged and classified manually and subsequently added to the proper pool. Once added, however, subsequent training can help sort and tag code encountered similar to this manually sorted code.

When attributes of unclassified code are identified that don't necessarily match or closely match attributes of the code in the classified pools of code additional automated training may also take place. This additional automated training may consider the functions, imports, or other attributes from code previously pooled in order to automatically classify the code with these new attributes. This dynamic automated training may include looking for specific imports and whether a certain percentage of these imports are satisfied. The dynamic training may also include looking for specific functions within the code, and whether several previously categorized functions are performed. The training may also include considering other features or attributes of the code. Moreover, in this and other embodiments, the code being considered may be compiled or uncompiled. In preferred embodiments, however, the same target architecture and the same compiler level will be preferably matched prior to tagging code, such as source code, and prior to training activities. Once unclassified source code is identified as belonging in a specific pool, the unidentified code may be used as a reference in subsequent lookups.

Figure 2:
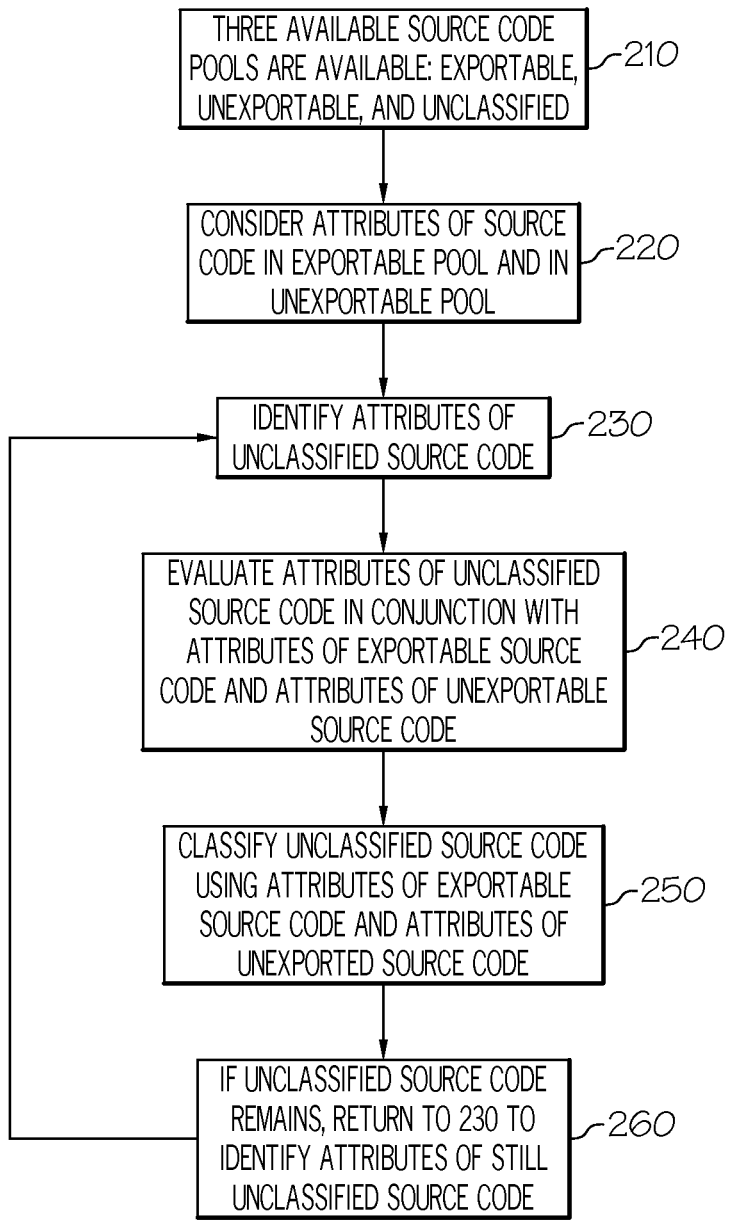
FIG. 2 shows a method of classifying code as may be employed in embodiments.

FIG. 2 shows a method as may be employed in embodiments. The various features, considerations, and actions of the method of FIG. 2 may be performed in various orders and with fewer or more actions or considerations. In FIG. 2, as shown at 210, three available source code pools are available. The source code pools are an exportable source code pool, a nonexportable source code pool, and an unclassified source code pool. As shown at 220, the attributes of source code in the exportable pool and in the nonexportable pool may be considered and used to classify subsequently analyzed code. At 230, attributes of unclassified source code may be identified. These identified attributes may be evaluated in light of the attributes of the exportable source code, and the attributes of the nonexportable source code. As shown at 240, this evaluation may lead to the classification of the previously unclassified source code.

As shown at 250, classification may include tagging source code as discussed above such that it may be readily sorted, culled, or otherwise manipulated by a CC an ECC or other system or methodology. As shown at 260, if unclassified source code remains it, too, may be identified as shown at 230. This classification loop may continue until a predetermined amount of unclassified source code has been classified or an amount of time has passed or some other threshold has been met.

Figure 3:
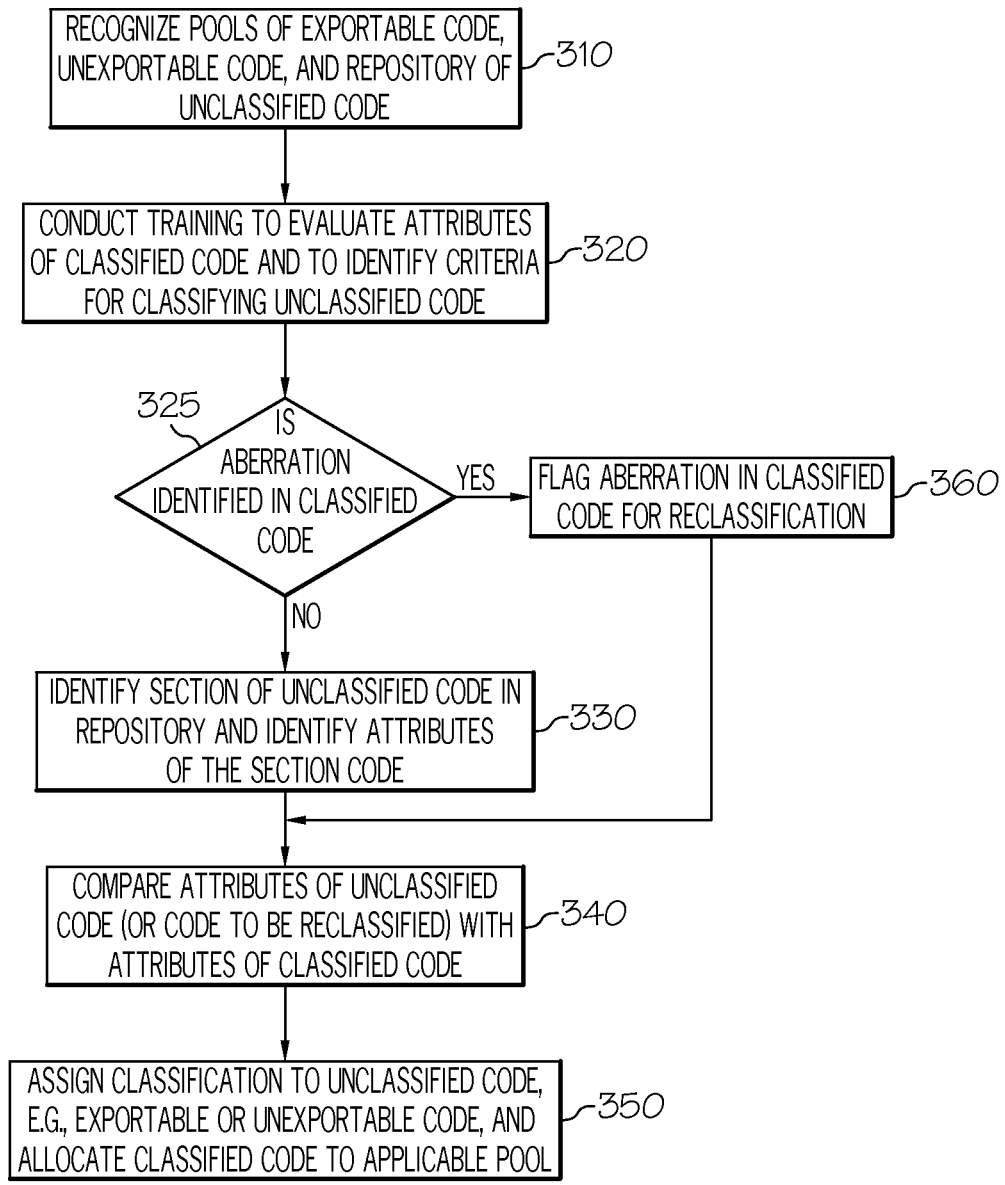
FIG. 3 shows a method of classifying code as may be employed in embodiments.

FIG. 3 shows a method as may be employed in embodiments. As with other methods and processes discussed herein, and with other embodiments, various other features may be included or removed while staying within the spirit and scope. As shown at 310, embodiments may include recognizing pools of exportable code, pools of nonexportable code, and also identifying a repository of unclassified code. Having these recognize pools and unclassified code, as shown at 320, training may be conducted to evaluate attributes of classified code. These attributes may be particular to exportable code, as well as to nonexportable code, and may be shared between each as well. These attributes may include links or calls for certain code, functions performed by certain code, and other specifics as to the text of the code. Still further, its interaction inputs and outputs, and the specific calls or links made to and from the code, may be considered as well.

Training may be an iterative process, where additions of new code may further enhance and streamline the recognition or tagging of unclassified code. An error feature may also be performed while training is conducted. This is shown in FIG. 3 at 325, which queries whether an aberration was identified in the classified code. If an aberration was found, as shown at 360, the aberration may be flagged such that the code can be reclassified as is needed. If no aberration is found, as shown at 330, the unclassified code may be reviewed and its functions, inputs, outputs, imports, or other attributes may be evaluated.

As shown at 340, attributes of the unclassified code may be compared with attributes of code classified as exportable and attributes of code classified as nonexportable. This comparison may result in the unclassified code being categorized as either exportable, or nonexportable. As shown at 350, a classification may be assigned to the unclassified code, and the now classified code may be allocated to a specific pool. This newly allocated code may also be considered during training activities for subsequent classification of unclassified code.

As noted above, the code being classified may be compiled, or uncompiled code. In either case, comparing code targeted for similar architectures or manipulated at similar compiler levels may be preferred when classification activities are conducted.

In embodiments, when training is conducted for future matching and tagging operations, a minimum threshold of accuracy may be set. In other words, an 85% match threshold may be required for placing code in a certain category pool and training changes may be made when this threshold is not being met by existing tagging operations. Still further, in embodiments, the sorting functionality may be improved by setting a 90% or 95% accuracy threshold rate, where tagging activities should meet these thresholds before modifications to the Classification Coder may be made.

Figure 4:
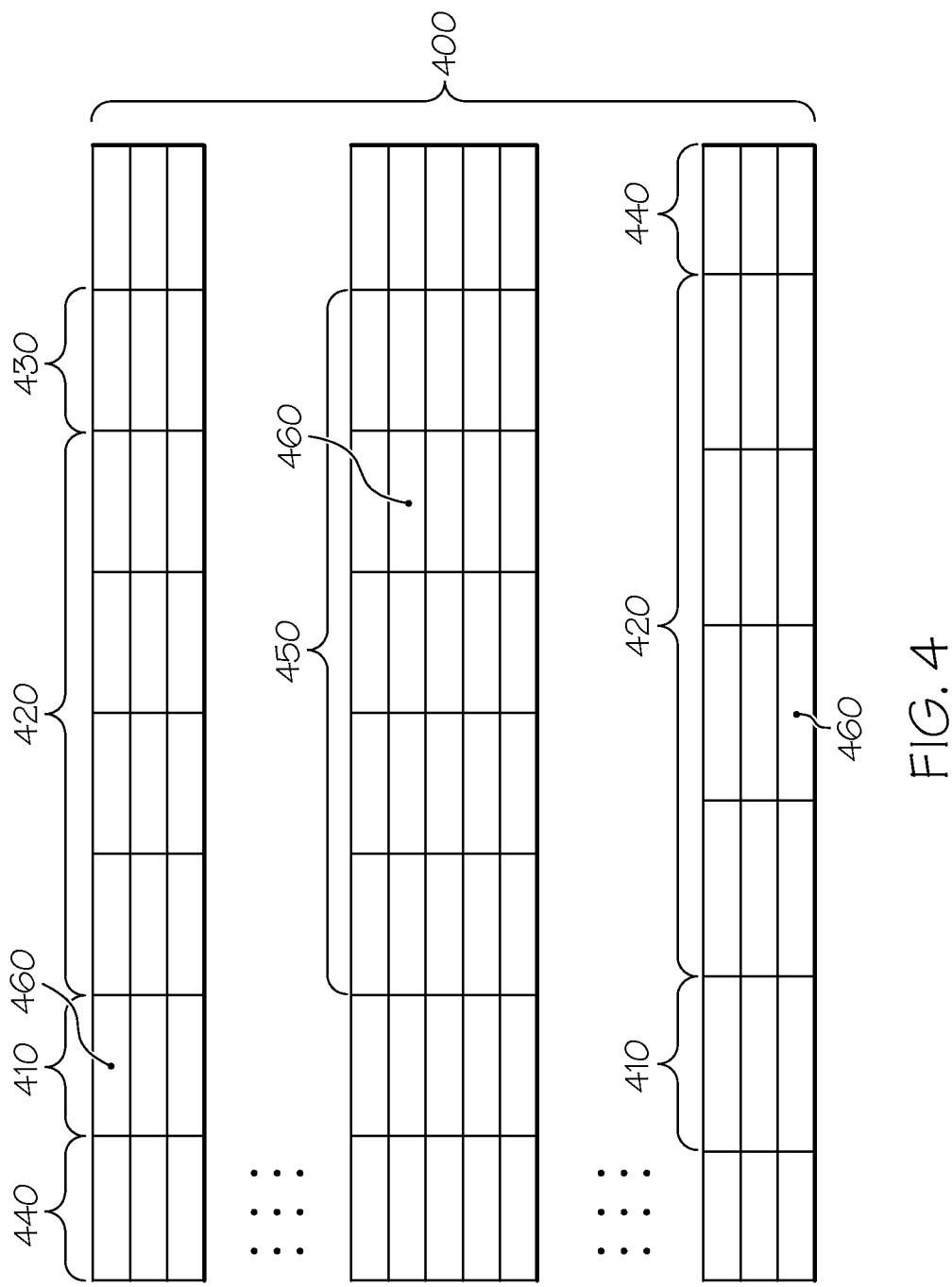
FIG. 4 shows categorized stored data as may be employed in embodiments.

FIG. 4 shows a table, and database structure as may be employed in embodiments. As can be seen, the database structure 400 includes various columns and various rows. The rows may be used for organizing particular information about a section of code and the columns may be used for organizing attributes or other features of the section of code. The rows may also be used to classify sections of code and for holding markers or flags associated with individual sections of code and groups of sections of code as well.

As can be seen, the column structure may not be continuous throughout the database with portions of the database having different numbers of columns from other portions of the database. In embodiments, the columns may contain various different fields of information applicable to a section of code. This information may include flags indicating whether source code associated with a specific row is exportable or nonexportable, whether certain inputs or outputs are present in a section of code, the type of functions performed by a section of code, and other attributes as well. These attributes may occupy four columns for each row, as shown at 420, as well as five columns, as shown at 450. Other column configurations may be used as well for storing attributes or other aspects of a section of code. Header and footer information 440 may also be used to identify source code that has been previously classified, as being exportable, not exportable, and for other reasons as well.

When methods are employed, a pointer may be used in memory of a CC or ECC to identify which code has been searched, is currently being considered and analyzed, and which may remain to be analyzed. For example, in embodiments, three pointers, such as 460 in FIG. 4, may be present in a database at any given time to allow for processing functions to work efficiently and economically under concurrent processing scenarios. Likewise, when functions are performed over a network, pointers may be used in the database, along with other techniques, to allow for simultaneous processing and efficient use of processing power.

Figure 5:
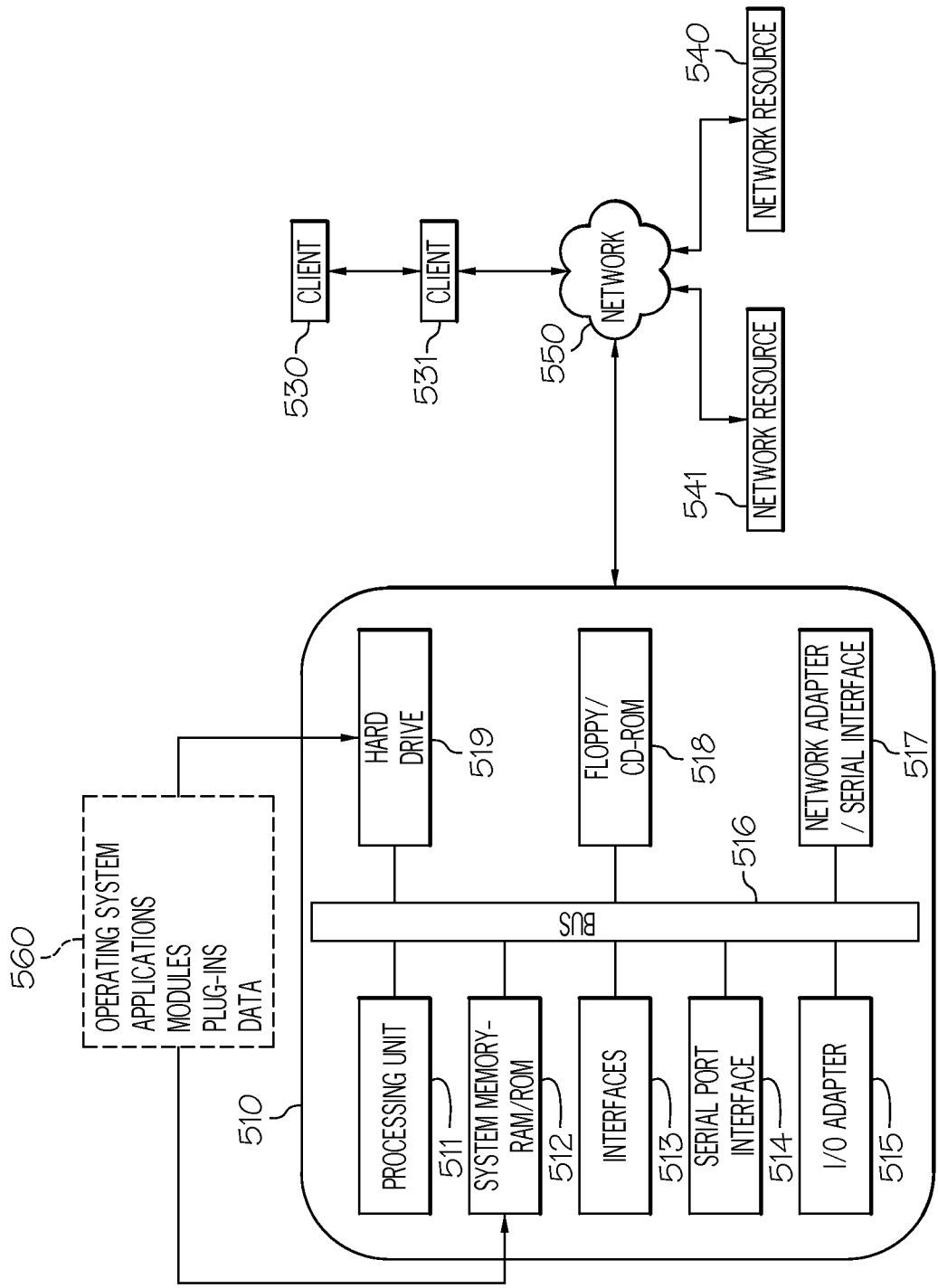
FIG. 5 shows a system including a computing device, a network, network resources, and clients, as may be employed in embodiments.

FIG. 5 shows a system as may be employed in embodiments. Labeled in FIG. 5 are a Classification Coder 510, client 530, client 531, network resource 540, network resource 541, and network 550 that serves to link computing device 510, clients 530-31, and network resources 540-41. The Classification Coder 510 in FIG. 5 includes a processing unit 511, system memory 412, interfaces 513, serial port interfaces 514, I/O adapters 515, hard drive 419, removable storage 518, and network adapter 517. These components within the computing device 510 may communicate with each other via the bus 516. As can also be seen in FIG. 5, client 530 and 531 may be part of a peer-to-peer network.

An operating system, along with applications, modules, plug-ins, and data, as shown at 560, may be stored in volatile and nonvolatile memory 512, as well as on memory hard drive 519. In embodiments, the CC 510 may carry out some or all of the steps, features and actions discussed herein. Comparatively, certain steps, features, and queries may also be performed over the network 550 between various devices connected to the network 550. For example, data may be stored at network resource 540, which is accessed by the computing device 510. Likewise, network resource 541 may serve as a compiler that compiles source code stored on network resource 540, in response to a compile or run instruction sent by client 531.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

While it is understood that the process software of a Classification Coder or Export Classification Coder may be deployed by manually loading directly in the client, server and proxy computers via loading a storage medium such as a CD, DVD, etc., the process software may also be automatically or semi-automatically deployed into a computer system by sending the process software to a central server or a group of central servers. The process software may then be downloaded into the client computers that will execute the process software. Alternatively the process software may be sent directly to the client system via e-mail. The process software may then either detached to a directory or loaded into a directory by a button on the e-mail that executes a program that detaches the process software into a directory. Another option is to send the process software directly to a directory on the client computer hard drive. When there are proxy servers, the process may select the proxy server code, determine on which computers to place the proxy servers' code, transmit the proxy server code, then install the proxy server code on the proxy computer. The process software may be transmitted to the proxy server and then it may be stored on the proxy server.

The process software which consists of a Classification Coder may be integrated into a client, server and network environment by providing for the process software to coexist with applications, operating systems and network operating systems software and then installing the process software on the clients and servers in the environment where the process software can function. The first step may be to identify any software on the clients and servers including the network operating system where the process software will be deployed that are required by the process software or that work in conjunction with the process software. This includes the network operating system that is software that enhances a basic operating system by adding networking features. Next, the software applications and version numbers may be identified and compared to the list of software applications and version numbers that have been tested to work with the process software. Those software applications that are missing or that do not match the correct version may be upgraded with the correct version numbers. Program instructions that pass parameters from the process software to the software applications may be checked to ensure the parameter lists match the parameter lists required by the process software. Conversely parameters passed by the software applications to the process software may be checked to ensure the parameters match the parameters required by the process software. The client and server operating systems including the network operating systems may be identified and compared to the list of operating systems, version numbers and network software that have been tested to work with the process software. Those operating systems, version numbers and network software that do not match the list of tested operating systems and version numbers may be upgraded on the clients and servers to the required level. After ensuring that the software, where the process software is to be deployed, is at the correct version level that has been tested to work with the process software, the integration may be completed by installing the process software on the clients and servers.

The process software of a Classification Coder may be shared, simultaneously serving multiple customers in a flexible, automated fashion. It may be standardized, requiring little customization and it may be scalable, providing capacity on demand in a pay-as-you-go model. The process software can be stored on a shared file system accessible from one or more servers. The process software may be executed via transactions that contain data and server processing requests that use CPU units on the accessed server. CPU units are units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions may be differentiated by the parameters included in the transactions that identify the unique customer and the type of service for that customer. All of the CPU units and other measurements of use that are used for the services for each customer may be recorded. When the number of transactions to any one server reaches a number that begins to affect the performance of that server, other servers may be accessed to increase the capacity and to share the workload. Likewise when other measurements of use such as network bandwidth, memory usage, storage usage, etc. approach a capacity so as to affect performance, additional network bandwidth, memory usage, storage etc. may be added to share the workload.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

What is claimed is:

1. A device for sorting computer code, the device comprising:
   a memory having instructions for execution by a processor; and
   a processor in communication with the memory and configured to load instructions from the memory, wherein the instructions for execution by the processor when executed by the processor, cause the processor to:

detect three pools of computer code, a first classified pool previously classified as representing a non-exportable pool of computer code, a second classified pool previously classified as representing an exportable pool of computer code, and a third previously unclassified pool, consider attributes of unclassified software code in the third pool and allocate the unclassified software code to the first pool when an attribute match for the first pool is found from considering and comparing the attributes of the unclassified code with the computer code attributes of the first pool, consider attributes of unclassified software code in the third pool and allocate the unclassified software code to the second pool when an attribute match for the second pool is found from considering and comparing the attributes of the unclassified code with the computer code attributes of the second pool, and perform incremental changes in subsequent attribute matching and allocation of unclassified code to the first pool or the second pool after identifying that a minimum threshold of accuracy is not being met for software code previously considered and allocated to the first pool or the second pool.

2. The device of claim 1, wherein the instructions for execution by the processor, when executed by the processor, further cause the processor to compare attributes of software code in the third pool with one or more governmental regulations regarding export of software from the United States.

3. The device of claim 1 wherein the instructions for execution by the processor, when executed by the processor, further cause the processor to:
conduct another consideration of previously allocated software code to verify the accuracy of the previous allocation, and dynamically generate the attributes for one or more of the unclassified code, the first pool, and the second pool.

4. The device of claim 1, wherein the instructions for execution by the processor, when executed by the processor, further cause the processor to further detect that the first pool contains software code having a third, fourth, fifth, and sixth attribute and that the second pool contains software code having a seventh, eighth, and ninth attribute, where each of the first through ninth attributes are different.

5. The device of claim 1, wherein the instructions for execution by the processor, when executed by the processor, further cause the processor to prompt a user to manually classify compiled or uncompiled software code in the third pool for allocation to the first pool or the second pool, and, upon receiving a manual classification, allocating the manually classified code to the first pool or the second pool.

6. The device of claim 1 wherein the first and second pools of computer code are stored in a memory table, the table adaptable to accept manual entry of additional code thereto.

7. The device of claim 1, wherein the instructions for execution by the processor, when executed by the processor, further cause the processor to
reconsider attributes of code in the first pool and the second pool after software from the third pool has been previously allocated to either the first pool or the second pool, and
search for a specific attribute in code previously pooled determining whether a certain percentage of the previously pooled code include this specific attribute.

8. An article of manufacture comprising:
a memory having instructions for execution by a processor, wherein the instructions for execution by the processor, when executed by the processor, cause the processor to:

detect three pools of computer source code, a first classified pool, a second classified pool, and a third unclassified pool, the first classified pool previously classified as representative of computer source code being non-exportable and the second classified pool previously classified as representative of computer source code being exportable, detect compiler level and target architecture for computer source code in the first pool, the second pool, and the third pool, and consider unclassified compiled software code or unclassified uncompiled software code in the third pool and compare the unclassified code with attributes of software code of the first pool and when an attribute match is identified between the unclassified code and the code of the first pool, allocate the unclassified code to the first pool, and consider unclassified compiled software code or uncompiled software code in the third pool and compare with attributes of the software code of the second pool and when an attribute match is identified between the unclassified code and the code of the second pool, allocate the unclassified code to the second pool.

9. The article of claim 8, wherein the instructions for execution by the processor, when executed by the processor, further cause the processor to compare attributes of software code in the third pool with one or more governmental regulations regarding export of software from the United States.

10. The article of claim 8 wherein the instructions for execution by the processor, when executed by the processor, further cause the processor to compare patterns of usage within the same target architecture when considering unclassified code and comparing with attributes of code in the second pool and the third pool.

11. The article of claim 8, wherein the instructions for execution by the processor, when executed by the processor, further cause the processor to further detect that the first pool contains software code having a third, fourth, fifth, and sixth attribute and that the second pool contains software code having a seventh, eighth, and ninth attribute, where each of the first through ninth attributes are different.

12. The article of claim 8, wherein the instructions for execution by the processor, when executed by the processor, further cause the processor to prompt a user to manually classify compiled or uncompiled software code in the third pool for allocation to the first pool or the second pool, and, upon receiving a manual classification, allocating the manually classified code to the first pool or the second pool.

13. The article of claim 8 wherein the first and second pools of computer code are stored in a memory table, the table adaptable to accept manual entry of additional code thereto, and wherein the attributes being matched from the first pool and the second pool are dynamically generated.

14. The article of claim 8, wherein the instructions for execution by the processor, when executed by the processor, further cause the processor to reconsider attributes of code in the first pool and the second pool,
after software from the third pool has been previously allocated to either the first pool or the second pool, and after a misclassification is identified of code already allocated to the first pool or the second pool.

15. A method for sorting computer code, the method comprising:
detecting three pools of computer code at a processor, a first previously classified pool, a second previously classified pool, and a third unclassified pool, the first pool representative of non-exportable computer code, the second pool representative of exportable computer code, considering, at a processor, dynamically generated attributes of unclassified compiled software code or unclassified uncompiled software code in the third pool and allocating the unclassified software code to the first pool when an attribute match between the unclassified code and the first pool is found and allocating the unclassified software code to the second pool when an attribute match between the unclassified code and the second pool is found, and reconsidering, at a processor, software code previously considered and allocated to the first pool or the second pool to determine whether the previously considered and allocated software code has been misclassified, and if a determination is made that the previously considered and allocated software code has been misclassified, reclassifying the software code for placement in a correct pool and for use in subsequent searches in that correct pool.

16. The method of claim 15, wherein a processor compares attributes of software code in the third pool with one or more governmental regulations regarding export of software from the United States.

17. The method of claim 15 wherein the processor applies a match threshold percentage where unclassified code is allocated to the first pool or the second pool only when a minimum match percentage is met between the considered attributes of the unclassified code and the allocated pool.

18. The method of claim 15, wherein a processor detects that the first pool contains software code having a third, fourth, fifth, and sixth attribute and that the second pool contains software code having a seventh, eighth, and ninth attribute, where each of the first through ninth attributes are different.

19. The method of claim 15, wherein a processor prompts a user to manually classify compiled or uncompiled software code in the third pool for allocation to the first pool or the second pool, and, upon receiving a manual classification, allocating the manually classified code to the first pool or the second pool.

20. The method of claim 15 wherein the first and second pools of computer code are stored in a memory table, the table adaptable to accept manual entry of additional code thereto.

21. The method of claim 15, wherein a processor reconsiders dynamically generated attributes of code in the first pool and the second pool after software from the third pool has been previously allocated to either the first pool or the second pool, and wherein the dynamically generated attributes are modified after being generated.

22. The method of claim 15 wherein the software code considered at the processor is compiled software code, and wherein the attributes considered for the unclassified code include target architecture and compiler level.

* * * * *